United States Patent

[11] 3,599,039

[72] Inventors: Takeo Miyashita, Saitama-ken; Kohshiro Ito, Tokyo, both of, Japan
[21] Appl. No.: 843,457
[22] Filed: July 22, 1969
[45] Patented: Aug. 10, 1971
[73] Assignee: Kabushikikaisha Tokyo Keiki Seizosho (Tokyo Keiki Seizosho Co., Ltd.) Tokyo, Japan
[32] Priority: Aug. 8, 1968
[33] Japan
[31] 55977/1968

[54] PHASE-SYNCHRONIZED ROTATING SYSTEM
5 Claims, 17 Drawing Figs.

[52] U.S. Cl. ................................................ 317/6, 343/118
[51] Int. Cl. .................................................. H02p 3/24
[50] Field of Search ........................................ 343/118; 317/6

[56] References Cited
UNITED STATES PATENTS
3,076,194  1/1963  Fitzgerald et al. ............ 343/118
3,118,142  1/1964  Emerson et al. ............... 317/6

Primary Examiner—J. D. Miller
Assistant Examiner—Harry E. Moose, Jr.
Attorney—Hill, Sherman, Meroni, Gross and Simpson ABSTRACT: A phase-synchronized rotating system for driving and synchronizing a pair of shafts which includes detecting means producing output signals indicative of the positions of the shafts which supply inputs to a logic circuit that controls the coupling between a synchronous generator driven by the first shaft and a synchronous motor which drives the second shaft. The logic circuit controls switches such that when the shaft positions coincide with each other dynamic braking is applied to the driven shaft and such that the synchronous generator drives a synchronous motor when the shaft positions do not coincide.

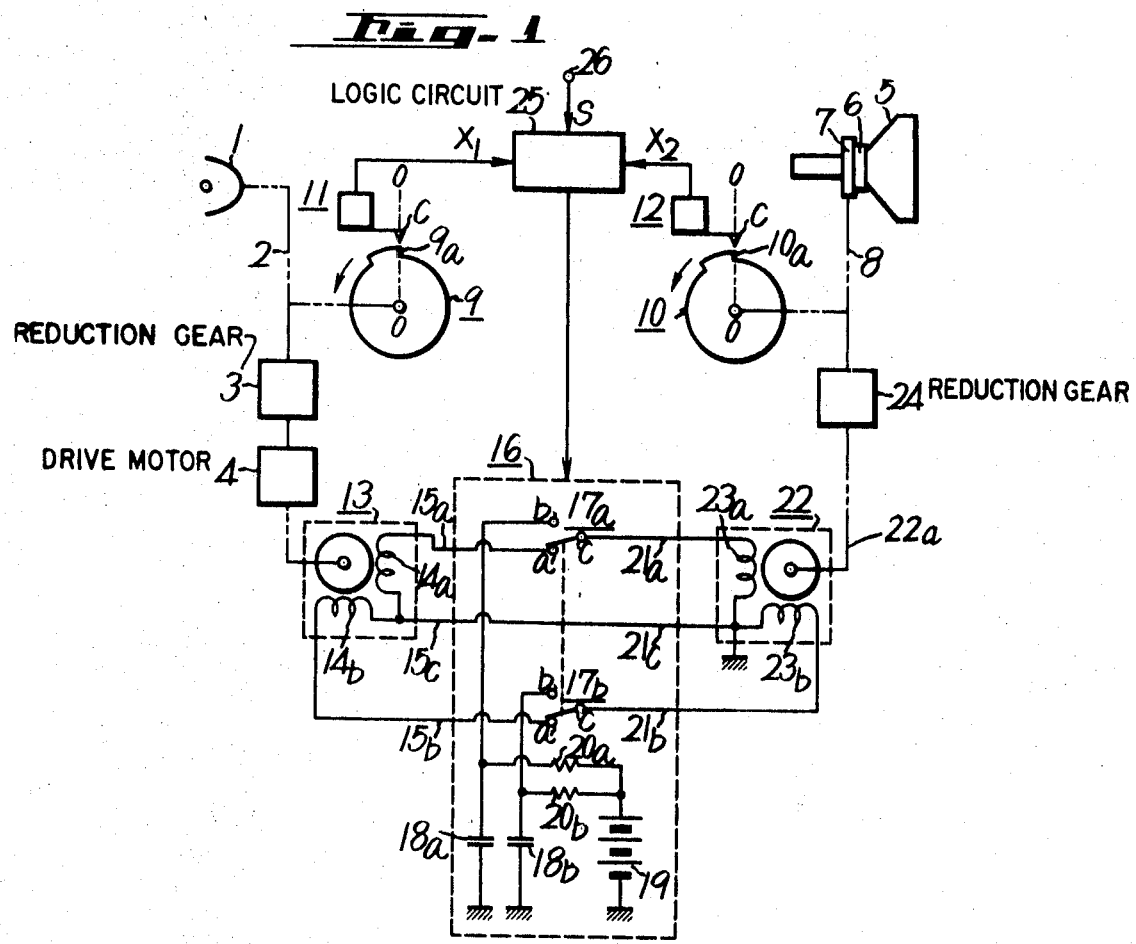
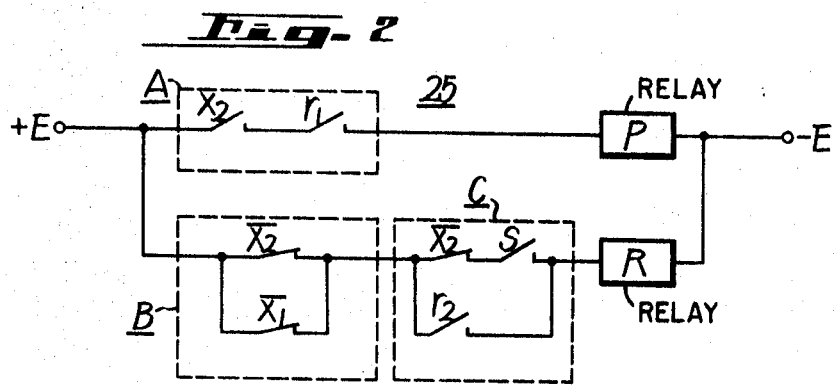

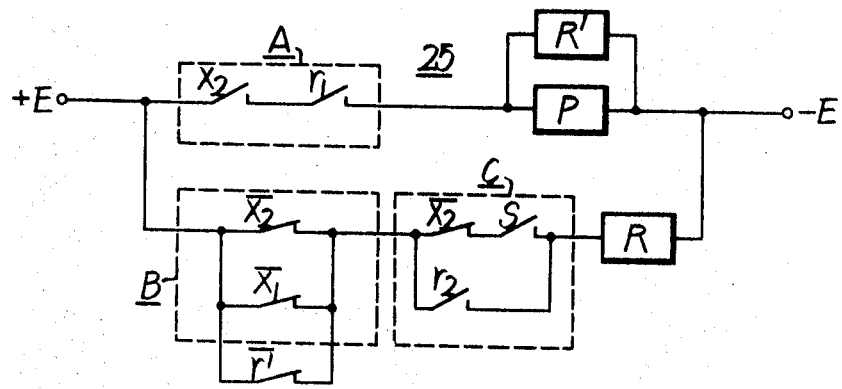
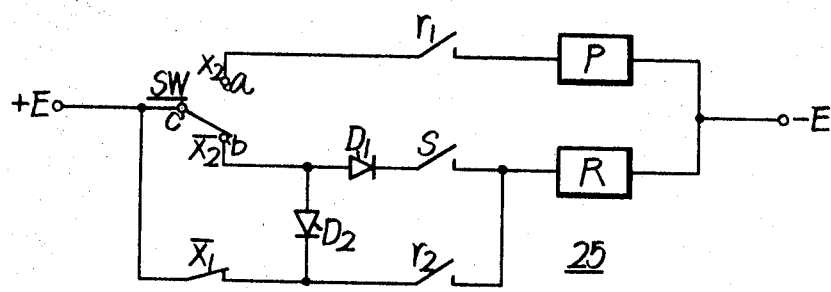
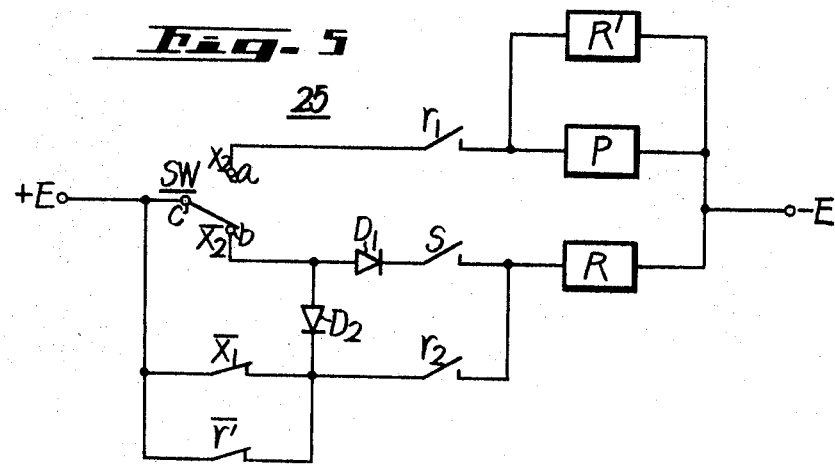

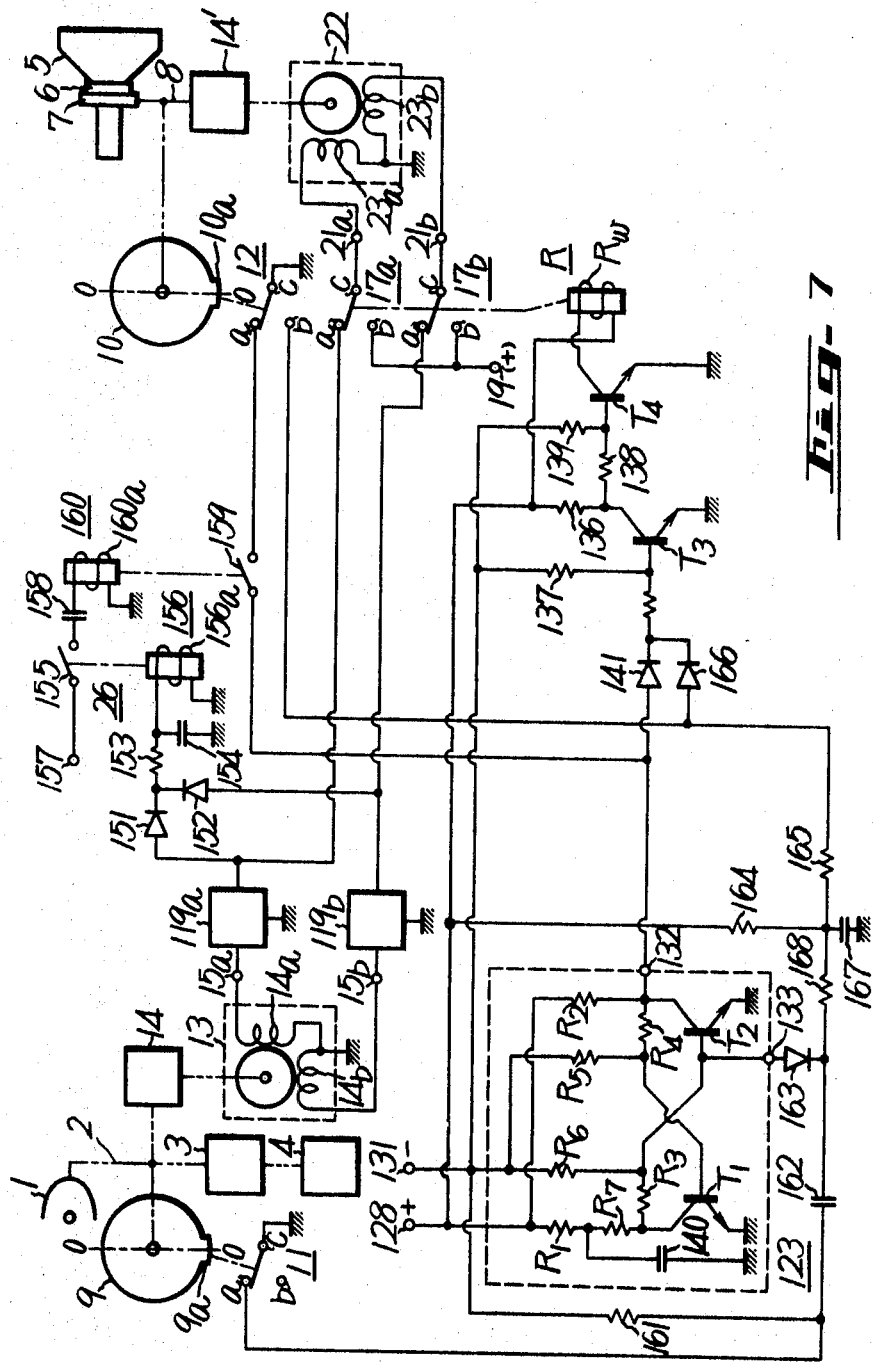

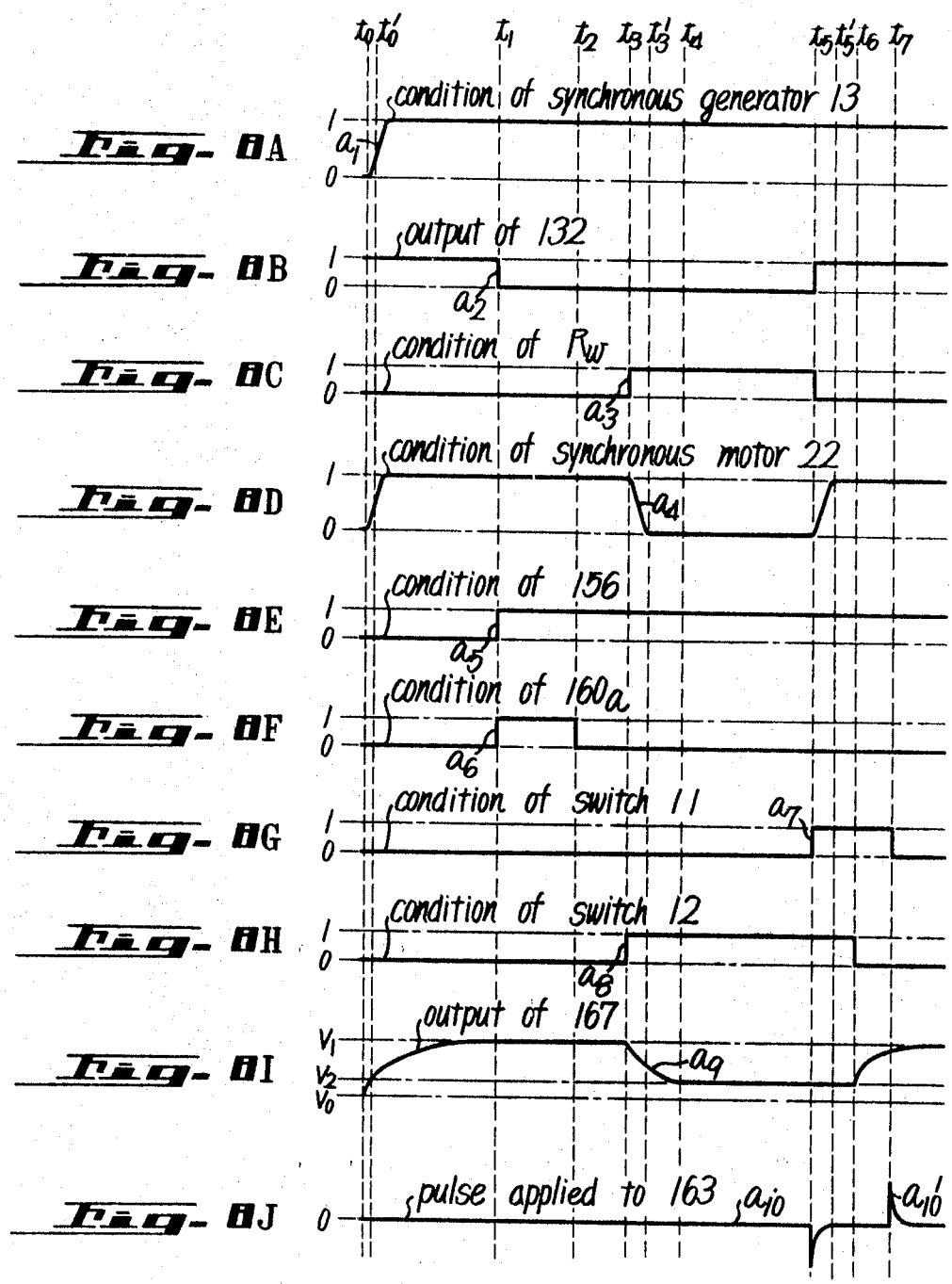

3,599,039

PHASE-SYNCHRONIZED ROTATING SYSTEM

BACKGROUND OF THE INVENTION

1. Field of the Invention

This invention relates to a phase-synchronized rotating system for driving two spaced rotary shafts in phase-synchronized relation to each other, and more particularly to such a system which is applicable to, for example, radar apparatuses.

2. Description of the Prior Art

Radar apparatus requires phase synchronization of continuous rotation of an antenna with plan-position indication of a cathode ray tube indicator and various phase-synchronized rotating systems have been proposed in the art. However, the prior art systems have drawbacks such as complexity, are expensive and unstable in phase synchronization and have low reliability. Hence these systems are not very satisfactory for practical use.

SUMMARY OF THE INVENTION

Accordingly, the present invention provides a phase-synchronized rotating system which is suitable for use with, for example, radar apparatuses for phase synchronization of the rotation of an antenna with the plan-position indication on a cathode-ray tube indicator and which is simple in construction, and capable of providing a stable phase-synchronized relationship which is highly reliable in operation.

BRIEF DESCRIPTION OF THE DRAWING

FIG. 1 is a system diagram illustrating one example of a phase-synchronized rotating system of this invention;

FIG. 2 is a block diagram showing one example of a logic circuit employed in the system exemplified in Figure 1;

FIG. 3 is a similar block diagram showing another example of the logic circuit;

FIGS. 4 and 5 are connection diagrams of the logic circuits depicted in Figures 2 and 3;

FIG. 7 is a similar system diagram showing still another example of the system of this invention; and FIGS. 8A—8J are diagrams for explaining the system shown in Figure 7.

DESCRIPTION OF THE PREFERRED EMBODIMENTS

Figure 6:
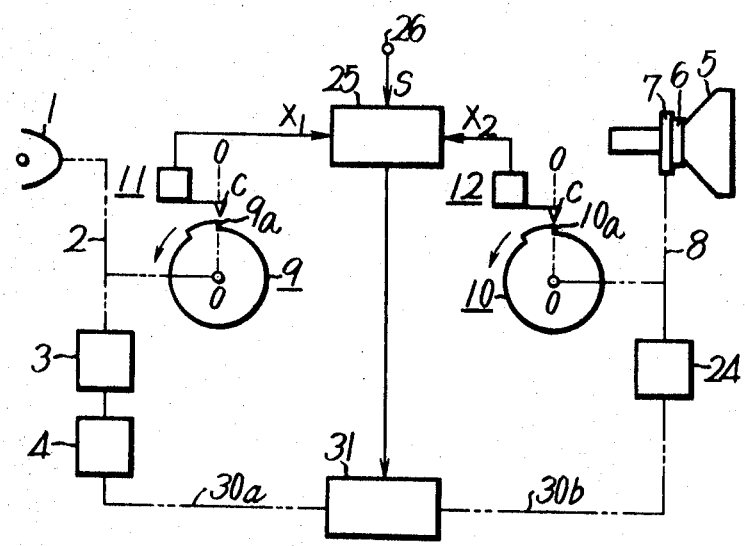
FIG. 6 is a system diagram, similar to Figure 1, illustrating another example of the phase-synchronized rotating system of this invention.

With reference to the drawings this invention will hereinafter be described as applied to a radar apparatus.

In Figure 1 reference numeral 1 indicates an antenna of the radar apparatus and its rotary shaft 2 indicated in dash-dot line is coupled to a drive motor 4 through a reduction gear 3. Reference numeral 5 designates a cathode ray tube indicator of the radar apparatus, which is provided with a rotary deflection coil 6. The rotary deflection coil 6 is mounted on a rotary support frame 7, which is in turn coupled through suitable rotary coupling means to a rotary shaft 8 indicated in dash-dot line. The rotary shaft 8 is driven in phase-synchronized relation to the rotary shaft 2 of the antenna 1.

In order to drive the rotary shafts 2 and 8 in phase-synchronized relation to each other, the rotary shafts 2 and 8 have respectively mounted thereon cams 9 and 10 having projecting cam faces 9a and 10a. In association with the cams 9 and 10 microswitches 11 and 12 are provided which have movable contacts c for engaging the cam faces 9a and 10a respectively. When the cam faces 9a and 10a of the cams 9 and 10 are at reference angular positions of 0–0, they are engaged with the contacts c of the microswitches 11 and 12 to close them. The microswitches 11 and 12 are held in their closed condition until the cam faces disengage the contacts c. Signals $X_1$ and $X_2$ are supplied from the microswitches 11 and 12 when they are closed.

The rotary shaft of the drive motor 4 is coupled to a rotor of a synchronous generator 13 to drive it. The synchronous generator 13 may be any of known types, for example, a bipolar generator such as shown in the figure. In the illustrated example in generator 13 two stator windings 14a and 14b are connected at one end to each other and the connection point is connected to a line 15c. Lines 15a and 15b are respectively led out from the other ends of the stator windings 14a and 14b. Lines 15a, 15b and 15c lead to a control circuit 16. The control circuit 16 has two ganged changeover switches 17a and 17b each of which is provided with two stationary contacts a and b and a moving contact c. The stationary contacts a of the switches 17a and 17b are connected to lines 15a and 15b respectively. In the control circuit 16 charging capacitors 18a and 18b are respectively inserted between the fixed contacts b and ground and are charged by a common braking DC power source 19 through resistors 20a and 20b respectively.

The moving contacts c of the switches 17a and 17b of the control circuit 16 are respectively energized by an output from a logic circuit 25, such as will be described later. Contacts c are respectively connected to external lines 21a and 21b and the line 15c introduced into the control circuit 16 is connected to an external line 21c. These lines 21a to 21c are connected to a synchronous motor 22, which may be any of known types but in the illustrated example it is a bipolar synchronous motor corresponding to the synchronous generator 13. The motor 22 has two stator windings 23a and 23b connected at one end to each other and the connection point is connected to the line 21c and is grounded. The other ends of the windings 23a and 23b are respectively connected to the lines 21a and 21b.

The synchronous generator 13 is driven by the drive motor 4 when the moving contacts c of the changeover switches 17a and 17b in engagement with the fixed contacts a in the control circuit 16 and generator 13 generates AC voltages having a predetermined phase difference in its windings 14a and 14b. The resulting AC voltages are applied through the lines 15a to 15c and 21a and 21c to the windings 23a and 23b of the synchronous motor 22 to drive it. Under such conditions, switching of the moving contacts c of the changeover switches 17a and 17b to the fixed contacts b causes the application of the charge previously stored in the charging capacitors 18a and 18b to the windings 23a and 23b of the synchronous motor 22 through the lines 21a and 21b. Thus, the synchronous motor 22 is braked by a DC current due to the charges and is immediately stopped. Since at this time DC current is continuously supplied to the windings 23a and 23b from the DC power source 19 through the resistors 20a and 20b respectively, the synchronous motor 22 is locked in its standstill condition. The synchronous motor 22 is released from its standstill condition by switching the moving contacts c of the changeover switches 17a and 17b to the fixed contacts a respectively and the motor 22 will then be driven by the electric power from the synchronous generator 13 in the same manner as described above.

The rotary shaft 22a of the synchronous motor 22 is coupled to the rotary shaft 8 through a reduction gear 24 having the same reduction gear ratio as that of the reduction gear 3.

In the present invention, the microswitches 11 and 12 associated with the cams 9 and 10 are connected to a logic circuit 25 which receives signals $X_1$ and $X_2$ and a synchronization instruction signal S from a synchronization instruction signal source 26.

The logic circuit 25 is adapted to start operation when it receives a synchronization instruction signal S from the synchronization instruction signal source 26. If a rotational phase difference exists between the rotary shafts 2 and 8, the moving contacts c of the changeover switches 17a and 17b of the control circuit 16 are respectively changed from the fixed contacts a to b by the output of the logic circuit 25 and a DC braking force is applied to the synchronous motor 22 synchronous to stop the motor 22. Under such conditions, when the rotary shafts 2 and 8 have become synchronized in phase with each other, the moving contacts c of the changeover switches 17a and 17b of the control circuit 16 are respectively switched from fixed contacts b to a to release the synchronous motor 22 from its locked condition. Thus, the drive motor 4 and the synchronous motor 22 are driven in phase-synchronized relationship to each other.

FIG. 2 illustrates one example of the logic circuit 25, in which the signals $X_1$ and $X_2$ and the synchronization instruction signal S are each shown in the form of a switch. Connected between power source terminals +E and -E is a series circuit of a stop and release instruction generator circuit A and a relay P for switching the moving contacts c of the changeover switches 17a and 17b of the control circuit 16. The circuit A consists of a series circuit of a normally open switch $X_2$ for the signal $X_2$ and a normally open contact $r_1$ of the relay R. Further, a series circuit comprising a synchronization detector circuit B, a synchronizing instruction holding circuit C and a relay R is connected in parallel to the series circuit of the circuit A and the relay P between the power source +E and -E. The circuit B consists of a parallel circuit of normally closed switches $\overline{X}_2$ and $\overline{X}_1$ for logic signals $\overline{X}_2$ and $\overline{X}_1$, and the circuit C consists of a series circuit of a normally closed switch $\overline{X}_2$ for the logic signal $\overline{X}_2$ and a normally open switch S for a logic signal S and a normally open contact $r_2$ of the relay R connected in parallel to the series circuit. The circuit C has an inhibit characteristic based upon the synchronizing instruction signal, that is, a signal representative of the angular position of the rotary shaft 8 relative to the logic signal S and, in other words, the logic signal $X_2$.

In practice, the switches for the logic signals $X_1$ and $\overline{X}_1$, $X_2$ and $\overline{X}_2$ may be synthesized with relay circuits energized by the signals $X_1$ and $X_2$ and their contacts, but they may be, for example, electronic circuits employing semiconductor elements. The logic signal S may be produced by the use of, for example, a pushbutton switch.

A description will hereinbelow be given in connection with the operation of the phase-synchronized rotation system of the arrangement described above.

A. Upon application of the synchronizing instruction signal from the synchronizing instruction signal source 26 of the logic signal S, the normally open switch S corresponding to the signal S is thereby closed. In this case:

i. If the logic signal $X_2=1$ ($\overline{X}_2=0$), the normally closed switches $\overline{X}_2$ of the circuits B and C remain open, so that the relay R is not energized and the normally open contact $r_1$ of the relay R is not closed. Accordingly, even if the normally open switch $X_2$ of the circuit A is closed, the relay P is not energized and the moving contacts c of the changeover switches 17a and 17b remain on the fixed contacts a, permitting continuous rotation of the cam 10 and consequently the rotary shaft 8.

ii. If the logic signal $X_2=0$ ($\overline{X}_2=1$), the closed switches $\overline{X}_2$ of the circuits B and C remain closed to energize the relay R, closing its normally open contacts $r_1$ and $r_2$. However, since the switch $X_2$ of the circuit A remains open, the relay P is not energized and the cam 10 and consequently the rotary shaft 8 continues to rotate as in the case of (i). In this case the relay R is self-maintained by its contact $r_2$ and the switches $\overline{X}_2$ and $\overline{X}_1$ of the circuit B.

B. Then, when $X_2=1(\overline{X}_2=0)$ under the conditions of (ii), the switch $X_2$ of the circuit A is closed and, at this time, the contact $r_1$ has already been closed, so that the relay P is energized to switch the moving contacts c of the changeover switches 17a and 17b from the fixed contacts a to b thereby to stop the synchronous motor 22, immediately stopping the cam plate 10 and the rotary shaft 8. Then, the conditions of $X_2=1$ is maintained. Also in this case, the relay R is self-held by its contact $r_2$ and the switch $\overline{X}_1$ of the circuit B.

C. When $X_1=1(\overline{X}_1=0)$ under the conditions of $X_2=1$, the switch $\overline{X}_1$ of the circuit B is opened to cut off the self-holding circuit of the relay R to deenergize it, opening its contact $r_2$. Thus, the self-holding of the circuit C is entirely released to open the contact $r_1$ of the circuit A, deenergizing the relay P. As a result of this, the moving contacts c of the changeover switches 17a and 17b of the control circuit 16 are changed to engage the fixed contacts a to supply the electric power of the synchronous generator 13 to the synchronous motor 22 to drive it, causing the cam 10 and the rotary shaft 8 to rotate. Thus, the rotary shaft 8 rotates in phase-synchronized relation to the rotary shaft 2.

In accordance with the present invention the rotary shaft 8 is controlled to be synchronized in phase with the rotary shaft 2 at every application of the synchronizing instruction signal S, so that the rotation of the antenna 1 and the plan-position indication on the cathode-ray tube indicator 5 can be accurately synchronized in phase with each other, and this operation can be achieved with simple construction. Further, the rotational angular range of the cam faces of the cams 9 and 10 for such phase control is limited only by that of the cam face 9a of the cam 9 and it is sufficient for the purpose only to previously establish the rotational angular range of the cam face 9a within a given limit range of tolerance between the rotary shafts 2 and 8. Thus, this invention has a great advantage which allows ease in the provision of a phase-synchronized system which is high in precision in phase synchronization, highly reliable in operation, and is inexpensive.

In the case where the logic circuit 25 depicted in FIG. 2 has been put into the condition of $X_1=1$ immediately after $X_2=1$ from its initial condition previously described under (ii), for example, in the case where the cam 10 is a little ahead of the cam 9, there is the possibility that the relay P is not substantially energized to permit continuous rotation of the cam 10 and consequently the rotary shaft 8 and phase synchronization cannot be established between the rotary shafts 2 and 8. As shown in FIG. 3, to avoid this, in the logic circuit 25 shown in FIG. 2 there is connected in parallel to the relay P a delay relay R' having characteristics of delayed action and recovery relative to the relay P and a normally closed contact $\overline{r}'$ of the relay R' is connected in parallel to the switch $\overline{X}_1$ of the circuit B.

In such a case, even if $X_1=1(\overline{X}_1=0)$ and the self-maintaining circuit of the relay R consisting of the switch $\overline{X}_2$ of the circuit B—the contact $r_2$ of the circuit C—the relay R—is about to be cutoff, a loop of the contact $\overline{r}'$ of the delay relay R'—$\overline{r}'$—the relay R is established due to the contact $\overline{r}'$ of the delay relay to hold the relay R in its self-maintaining condition until the contact $\overline{r}'$ has recovered, during which time the relay P is energized without fail, thus ensuring phase synchronization of the rotary shafts 2 and 8.

In FIG. 4 there is illustrated one embodiment of the logic circuit 25 of which the fundamental circuit construction has been described above with FIG. 2.

The power source +E is connected to a moving contact c of a changeover switch SW which is connected to a fixed contact a when $X_2=1(\overline{X}_2=0)$ and is connected to a fixed contact b when $X_2=0(\overline{X}_2=1)$. The fixed contact a of the switch SW is connected to the power source -E through the contact $r_1$ of the relay R and the relay P, while the fixed contact b of the switch SW is connected to the power source -E through a unidirectional conductive element $D_1$, the normally open switch S for the logic signal S and the relay R or through a unidirectional conductive element $D_2$, the contact $r_2$ of the relay R and the relay R. Further, the normally closed switch $\overline{X}_1$ for the logic signal $\overline{X}_1$ is interposed between the power source +E and the connection point of the unidirectional conductive element $D_2$ with the contact $r_2$ of the relay R.

FIG. 5 illustrates one embodiment of the logic circuit shown in FIG. 3. As depicted in FIG. 5, the delay relay R' is connected in parallel to the relay P and its normally closed contact $\overline{r}'$ is connected in parallel to the switch $\overline{X}_1$.

With such an arrangement, in FIGS. 4 and 5 the fixed contacts a of the changeover switch SW correspond to the switch $X_2$ of the circuit A in FIGS. 2 and 3 and the fixed contacts b correspond to the switches $\overline{X}_2$ and $\overline{X}_2$ of the circuits B and C.

Thus, the switch SW with the fixed contacts a and b has the same functions as the circuits A, B and C and provides operational effects similar to those described above.

It is also possible to construct the control circuit 16 so that the line between the synchronous generator 13 and the synchronous motor 22 is disconnected or connected by the output of the logic circuit 25 (accordingly the circuit including the capacitors 18a and 18b and the power source 19 is left out) and so that the braking means is electromagnetically energized in relation to the rotary shaft of the synchronous motor 22 and is controlled by one portion of the output of the logic circuit 25.

Further, it is also possible in some cases to construct the system of this invention as shown in FIG. 6, in which the synchronous generator 13 and the synchronous motor 22 used in the example of FIG. 1 are omitted and the rotor of the motor 4 is coupled to an input shaft of the reduction gear 24 by means of a rotary shafts 30a and 30b. A clutch means 31 is incorporated between rotary shafts 30a and 30b and is controlled by the output of the logic circuit 25.

Referring now to FIGS. 7 and 8, a description will be given of another embodiment of the phase-synchronized rotating system of this invention. In FIG. 7 similar elements to those in the foregoing examples are identified by the same reference numerals and characters.

Reference numeral 1 indicates an antenna of a radar apparatus and its rotary shaft 2 indicated in dash-dot line is coupled to a reduction gear 3 which is coupled to a drive motor 4.

Reference numeral 5 designates a cathode-ray tube indicator of the radar apparatus, which has a rotary deflection coil 6, which is, in turn, secured to a rotary support frame 7 coupled to a rotary shaft 8 indicated in dash-dot line through the use of suitable rotary coupling means. The rotary shaft 8 is to be driven in phase-synchronized relation to the rotary shaft 2 of the antenna 1.

For detection of the rotational phase position of the rotary shaft 2, a cam 9 having a projecting cam face 9a is mounted on the rotary shaft 2 and a switch 11 consisting of fixed contacts a and b and a moving contact c therefor is disposed in opposing relation to the cam 9. When the cam face 9a has been brought to a predetermined or reference angular position 0-0, the cam face 9a engages the moving contact c of the switch 11 to bring it into contact with the fixed contact b. The moving contact c is held in engagement with the fixed contact b until the moving contact c disengages from the cam face 9a, and the moving contact c engages the contact a while it is out of contact with the cam face 9a.

Further, in order to detect the rotational phase of the rotary shaft 8, the shaft 8 has affixed thereto a cam 10 which has a projecting cam face 10a having the same rotational angle as the cam face 9a of the cam 9. Opposite the cam 10 there is provided a switch 12 consisting of fixed contacts a and b and a moving contact c therefor. When the cam face 10a has been brought to a predetermined or reference angular position 0-0, it engages the moving contact c of the switch 12 to bring the contact c into contact with the fixed contact b. The moving contact c is held in engagement with the contact b until the moving contact c disengages from the cam face 10a, and the moving contact c engages the contact a while it is out of contact with the cam face 10a.

The rotor of a synchronous generator 13 is coupled through a speed up gear mechanism 14 to the rotary shaft of the drive motor 4 or the rotary shaft 2 in the figure to drive the synchronous generator 13 together with the rotary shaft 2 by the drive motor 4. The synchronous generator 13 may be any of known types, for example, a bipolar generator such as shown in the figure which has two stator windings 14a and 14b connected at one end to each other. The connection point is grounded and the other ends of the windings are respectively connected to terminals 15a and 15b.

A synchronous motor 22 is provided for driving the rotary shaft 8. The synchronous motor 22 may be any of known types and in the illustrated example it is of the bipolar type corresponding to the synchronous generator 13. The rotor of the motor 22 is coupled to the rotary shaft 8 through a reduction gear assembly 14' having a reduction gear ratio which is exactly opposite to the speed up ratio of the speed up gear assembly 14. Further, two stator windings 23a and 23b of the motor 22 are connected at one end to each other and the connection point is grounded, while the other ends of the windings 23a and 23b are respectively connected to terminals 21a and 21b.

The terminal 15a of the synchronous generator 13 is connected to the terminal 21a of the synchronous motor 22 through an amplifier circuit 119a and a fixed contact a and a moving contact c of a changeover switch 17a of a relay to be described later. The terminal 15b of the synchronous generator 13 is connected to the terminal 21b of the synchronous motor 22 through an amplifier circuit 119b and a fixed contact a and a moving contact c of a changeover switch 17b ganged with the changeover switch 17a. Consequently, when AC signals are sequentially induced in the windings 14a and 14b of the synchronous generator 13 while being displaced a predetermined angle apart in phase, they are fed to the synchronous motor 22 through the moving contacts c of the switches 17a and 17b held on the fixed contacts a thereof, by which the synchronous motor 22 is driven in phase-synchronized relation to the synchronous generator 13.

The terminals 21a and 21b of the synchronous motor 22 are respectively connected to, for example, a positive DC power source terminal 19 through the moving contacts c and the fixed contacts b of the switches 17a and 17b. Accordingly, when the moving contacts c of the switches 17a and 17b are changed over to the fixed contacts b when the synchronous motor 22 is being driven, DC current is fed from the power source terminal 19 to the windings 23a and 23b of the synchronous motor 22 through the contacts to apply DC braking to the motor 22 and hence stop it.

Reference numeral 123 designates a bistable circuit including transistors $T_1$ and $T_2$, the transistor $T_1$ having its collector connected to a positive power source terminal 128 through resistors $R_1$ and $R_7$, the transistor $T_2$ having its collector connected to the terminal 128 through a resistor $R_2$ and the both transistors having their emitters grounded. The collector of each of the transistors $T_1$ and $T_2$ is further connected to the base of the other through resistors $R_3$ and $R_4$ respectively and the bases of the transistors $T_1$ and $T_2$ are connected to a negative power source terminal 131 through resistors $R_5$ and $R_6$ respectively. A charging capacitor 140 is connected between the connection point of the resistors $R_1$ and $R_7$ and ground. An output terminal 132 is led out from the collector of the transistor $T_2$ and an input terminal 133 is led out from the base of the transistor $T_2$. In the bistable circuit 123, when predetermined positive and negative voltages are applied to the power source terminals 128 and 131 the transistor $T_2$ is immediately supplied with a predetermined voltage but the transistor $T_1$ is not supplied with a predetermined voltage until after the capacitor 140 has been charged since the transistor $T_1$ has its collector connected to the capacitor 140. As a result of this, upon every application of the predetermined voltages to the power source terminals 128 and 131, the transistor $T_1$ is put in the on state and the transistor $T_2$ is put in the off state. Under such conditions, if the terminal 132 is grounded, the transistors $T_1$ and $T_2$ are respectively driven into the off and on state and application of a negative pulse to the terminal 133 under these conditions renders the transistors $T_1$ and $T_2$ conductive and nonconductive, respectively.

Reference characters $T_3$ and $T_4$ indicate switching transistors, the transistor $T_3$ having its collector and base connected to the power source terminals 128 and 131 through resistors 136 and 137 respectively and having its emitter grounded. While, the transistor $T_4$ has its collector connected to the power source terminal 128 through a winding Rw of a relay R for driving the moving contacts c of the switches 17a and 17b. The base of the transistor $T_4$ is connected to the power source terminal 131 through a resistor 139 and its emitter is grounded. The output terminal 132 of the bistable circuit 123 is connected to the base of the transistor $T_3$ through a diode 141 and the collector of the transistor $T_3$ is connected to the base of the transistor $T_4$ through a resistor 138. The bistable circuit 123 is adapted so that when the transistor $T_2$ is in the off state a positive voltage derived at the output terminal 132 is applied through the diode 141 to the base of the transistor $T_3$ to render it conductive and a resulting voltage at the collector of the transistor $T_3$ is fed to the base of the transistor $T_4$ to put it in the off state to cut off a current flowing to the relay winding $Rw$, thereby holding the moving contacts $c$ of the switches 17$a$ and 17$b$ on the fixed contacts $a$.

The out terminals of the amplifiers 119$a$ and 119$b$ are respectively grounded through diodes 151 and 152 and through a common resistor 153 and capacitor 154 so that AC signals obtained in the amplifiers 119$a$ and 119$b$ are rectified to provide a voltage of positive polarity across the capacitor 154. A winding 156$a$ of a relay 156 having a contact 155 is connected to both ends of the capacitor 154 and is adapted such that while a predetermined voltage is obtained across the capacitor 154 the relay winding 156$a$ is supplied with a current to close its contact 155. A positive power source terminal 157 is grounded through the contact 155, a capacitor 158 and a coil 160$a$ of a relay 160 having a contact 159. While the contact 155 is closed the relay coil 160$a$ is supplied with a current to close its contact 159 until the capacitor is charged and when the capacitor 158 has been charged no current flows to the relay coil 160$a$ to open the contact 159.

Further, the bistable circuit 123 is designed such that its output terminal 132 is grounded through the contact 159 and the contacts $a$ to $c$ of the switch 12 and that when the terminal 132 is grounded the transistor $T_2$ having remained in the off state is put in the on state and the transistor $T_1$ having remained in the on state is changed to the off state.

The power source terminal 131 is adapted to be grounded through a resistor 161 and the contacts $a$ and $c$ of the aforementioned switch 11 and the connection point of the switch 11 with the resistor 161 is connected to the input terminal 133 of the bistable circuit 123 through a capacitor 162 and a diode 163. When the moving contact $c$ of the switch 11 held on the contact $a$ is moved to the contact $b$, a pulse of negative polarity is obtained at the connection point of the resistor 161 with the switch 11 and is applied through the capacitor 162 and the diode 163 to the input terminal 133 of the bistable circuit 123, by which the transistor $T_2$ having been held in the on state is put in the off state and the transistor $T_1$ having remained in the off state is put in the on state.

The power source terminal 128 is adapted to be grounded through resistors 164 and 165 and the contacts $b$ and $c$ of the switch 12 and the connection point of the resistor 165 with the switch 12 is connected through a diode 166 to the base of the transistor $T_3$. When the contact $c$ of the switch 12 engages the contact $a$ that is, when the resistor 165 is not grounded, the diode 166 is conductive, through which a positive voltage is applied to the base of the transistor $T_3$ to render it in the on state, while at the same time rendering the transistor $T_4$ nonconductive to cut off the current to the relay coil $Rw$. A capacitor 167 is connected between the connection point of the resistors 164 and 165 and ground and the electrode of the capacitor 167 on the opposite side from ground is connected through a resistor 168 to the connection point of the diode 163 with the capacitor 162. While the contact $c$ of the switch 12 engages the contact $a$, a voltage of positive polarity is stored in the capacitor 167 and is applied as a reverse bias to the diode 163. Under such conditions, when the contact $c$ of the switch 12 has been changed over to the contact $b$ the charge stored in the capacitor 167 is discharged with a time constant depending upon the capacity of the capacitor 167 and the resistance value of the resistor 165 and the reverse bias applied to the diode 163 gradually decreases. When the reverse bias has reached a predetermined value and does not vary, the contact $c$ of the switch 11 is changed over to the contact $b$ from $a$ and a pulse of negative polarity is applied through the diode 163 to the input terminal 133 of the bistable circuit 123.

The foregoing has outlined one example of the construction of this invention system and a description will be given of the operation of the system.

When the drive motor 4 is driven by applying thereto electric power from a power source (not shown), the rotary shaft 2 and consequently the antenna 1 is driven through the reduction gear assembly 3 to drive the synchronous generator 13 through the gear assembly 14, deriving an AC signal from the generator 13. Simultaneously with the driving of the drive motor 4, the power source terminals 128, 131, 19 and 157 are supplied with predetermined voltages and especially the power source terminal 128 is supplied with a predetermined positive voltage, so that the transistors $T_2$ and $T_1$ are respectively rendered in the off and on state irrespective of their previous conditions because the capacitor 140 is connected to the collector of the transistor $T_1$ of the bistable circuit 123. Consequently, a voltage derived at the output terminal 132 of the bistable circuit 123 is applied through the diode 141 to the base of the transistor $T_3$ to put it in the on state, and hence the transistor $T_4$ remains in the off state. Therefore, no current flows to the relay coil $Rw$ and the moving contacts $c$ of the changeover switches 17$a$ and 17$b$ are held on the fixed contacts $a$. As a result, the AC signal produced by the synchronous generator 13 is fed to the synchronous motor 22 through the amplifiers 119$a$ and 119$b$ to initiate driving of the motor 22, which leads to driving of the rotary shaft 8 and consequently the rotary deflection coil 6.

Accordingly, in the case where the motor 4 is driven and the power source terminals 128, 131, 19 and 157 are supplied with predetermined voltages at a time $t_0$ (refer to FIG. 8), the motor 4 starts to rotate from the $t_0$ and reaches its steady rotating state through an inclined portion of the rise as indicated by a curve $a_1$. The standstill condition of the motor 4 is indicated by "0" and its steady rotating condition is by "1". From the time $t_0$ there is derived at the output terminal 132 of the bistable circuit 123 a positive voltage (referred to as "1") such as indicated by a curve $a_2$ in FIG. 8B. For a little while after the time $t_0$ no current flows to the relay coil $Rw$ as indicated by a curve $a_3$ in FIG. 8C (referred to as "0") and the synchronous motor 22 initiate rotating from its standstill condition (referred to as "0") from the time $t_0$ and reaches its steady rotating state (referred to as "1") through an inclined portion of the rise as indicated by a curve $a_4$ in FIG. 8D.

Meanwhile, since the synchronous generator 13 produces the AC signal, a DC voltage is produced at the capacitor 154, by which the relay coil 156$a$ having been nonconductive (identified as "0") is rendered conductive (identified as "1") from a time $t_1$ a little after $t_0$ as indicated by a curve $a_5$ in FIG. 8E. The conduction of the relay coil 156$a$ leads to closing of its contact 155, by which the relay coil 160$a$ having been nonconductive (identified as "0") is rendered conductive (identified as "1") by the current from the source 157 through the capacitor 158 as indicated by a curve $a_6$ in FIG. 8F. However, the current to the relay coil 160$a$ is cut off to render it nonconductive again from a time $t_2$ when the capacitor 158 has been entirely charged by the power source terminal 157.

Even if the rotary shafts 2 and 8 are driven as described above at least prior to the time $t_2$, the cam faces 9$a$ and 10$a$ of the cams 9 and 10 do not engage the moving contacts $c$ of the switches 11 and 12 respectively. Assuming that the moving contacts $c$ of the switches 11 and 12 stay on the contacts $a$ (identified as "0") as indicated by curves $a_7$ and $a_8$ in FIGS. 8G and 8H, the output terminal 132 of the bistable circuit 123 is grounded through the contact 159 and the contacts $a$ and $c$ of the switch 12 at the time $t_1$, by which the transistor $T_1$ held in the on state is put in the off state and the transistor $T_2$ held in the off state is put in the on state, and the output at the output terminal 132 having the output "1" is reduced to a lower voltage (identified as "0"). Accordingly, the transistor $T_3$ is not supplied with the output "1" of the bistable circuit 123 from the time $t_1$. However, since the contact $c$ of the switch 12 is retained on the contact $a$ to the time $t_2$ and the resistor 165 is not grounded, a positive voltage derived from the power source terminal 128 is fed to the transistor $T_3$ through the diode 166 (the voltage at this time being identified as "1"). As a result of this, the transistor $T_3$ is supplied with the output of "1" after the time $t_1$, too, and hence it is turned on and the transistor $T_4$ is turned off, thus holding the relay coil $Rw$ nonconductive, namely "0".

Thus, when the cam face 10a of the cam 10 engages the moving contact $c$ of the switch 12 at a time $t_3$ after $t_2$ and the contact $c$ is changed over to $b$ (this condition being identified as "1"), the resistor 165 is grounded, so that the output "1" applied to the transistor $T_3$ through the diode 166 becomes "0" to turn off the transistor $T_3$ and on the transistor $T_4$. Consequently, the relay coil $Rw$ becomes conductive at the time $t_3$ (this condition being identified as "1") to switch the contacts $c$ of the switches 17a and 17b to the contacts $b$ (this condition being identified as "1"). Accordingly, DC current flows to the windings 23a and 23b of the synchronous motor 22 through the power source terminal 19 and the contacts $b$ and $c$ of the switches 17a and 17b to apply DC braking force to the motor 22, with the result that the motor 22 comes to a standstill condition identified as "0" after gradual decrease in its revolving speed.

While, application of the voltage to the power source terminal 128 from the time $t_0$ leads to charging of the capacitor 167 through the resistor 164, so that the voltage across the capacitor 167 held at zero (referred to as $V_0$) becomes a positive voltage (referred to as $V_1$) through an inclined portion as indicated by a curve $a_9$ in FIG. 8I. However, since the switch 12 is in the condition of "1" after the time $t_3$, the charging voltage $V_1$ is gradually discharged through the resistor 165 to produce an inclined voltage, which becomes a steady-state current $V_2$ between $V_0$ and $V_1$ at a time $t_4$ in accordance with a discharge time constant determined by the resistor 164 and the capacitor 167 and a discharge time constant determined by the resistor 165 and the capacitor 167.

Thus, the cam face 9a of the cam 9 engages the moving contact $c$ of the switch 11 at a time $t_5$ and when the contact $c$ is changed over to the contact $b$ (this condition being identified as "1") the grounding circuit of the resistor 161 grounded is cut off to produce a negative pulse at the time $t_5$ as indicated by a curve $a_{10}$ in FIG. 8J and the pulse is applied to the diode 163. In this case, the voltage across the capacitor 167 is fed as a bias voltage to the diode 163 through the resistor 168 but the bias voltage at the time $t_5$ is $V_2$ and hence is shallow, so that the negative pulse at the time $t_5$ is applied to the input terminal 133 of the bistable circuit 123 to cause the transistor $T_2$ held in the on state to be turned off and the transistor $T_1$ held in the off state to be turned on. While, since the relay coil 160a is in the condition of "0" at the time $t_5$, an output of "1" is derived at the output terminal 132 at the time $t_5$. The resulting output of "1" is fed through the diode 141 to the base of the transistor $T_3$ to turn it on and the transistor $T_4$ is switched off to cause the relay coil $Rw$ to be in the condition of "0", with the result that the contacts $c$ of the switches 17a and 17b are changed over to the contacts $a$ to be in the condition of "0". Since the switches 17a and 17b are in the condition of "0", the synchronous motor 22, which has been applied DC braking force and in its standstill condition, starts to rotate due to the AC signal from the generator 13 at the time $t_5$ and then reaches its steady rotating condition of "1" after the inclined portion. As a result of this, the switch 12 is put in the condition of "0" at the time $t_5$ or a time $t_6$ (shown as a time following $t_5$) and the switch 11 is put in the condition of "0" at a time $t_7$. The time from $t_5$ to $t_7$ corresponds to a time during which the cam face 9a of the cam 9 is in engagement with the moving contact $c$ of the switch 11. Although the rotational angle of the cam face 10a of the cam 10 is substantially equal to that of the cam face 9a of the cam 9, when the synchronous motor 22 is given braking force at the time $t_3$ it is altered to the condition of "0" not at the time $t_3$ but at a time $t_3'$ a little behind it. Namely, despite of application of braking force to the synchronous motor 22 at the time $t_3$, the synchronous motor 22 and accordingly the rotary shaft 8 continues to rotate a little until the time $t_3'$ (within a range in which the cam face 10a is not disengaged from the moving contact $c$ of the switch 12). While, the braking force rendered to the synchronous motor 22 is released from the time $t_5$ but the synchronous motor 22 is put in the condition of "1" not at the time $t_5$ but at a time $t_5'$ a little behind it. Accordingly, the time from $t_5$ to $t_6$ is a little shorter than that from $t_5$ to $t_7$.

Thus, the synchronous motor 22 starts to rotate from the time $t_5$, so that the rotary shafts 2 and 8 are subsequently driven in phase-synchronized relation to each other while having a phase difference corresponding to the time from $t_6$ to $t_7$. Since the rise time of the synchronous motor 22 is always a predetermined value and the motor 22 starts from its standstill condition, the time from $t_6$ to $t_7$ is always constant, which ensures accurate phase-synchronized relation. Accordingly, the antenna 1 and the rotary deflection coil 6 are driven in a predetermined phase-synchronized relation. At the time $t_7$ the switch 11 is put in the condition of "0" to produce a positive pulse such as indicated by $a_{10}'$ in the curve $a_{10}$ in FIG. 8J but this pulse is intercepted by the diode 163, ensuring that the output of the output terminal 132 of the bistable circuit 123 does not change in condition from "1" to "0". Subsequent to the time $t_6$ the capacitor 167 is charged.

Although the foregoing description has been made on the assumption that the switch 11 is put into the condition of "1" at the time $t_5$ after the motor 22 has been put into the condition of "0" at the time $t_4$, it is possible in some cases that the switch 11 is put into the condition of "1" prior to the time $t_4$. If the switch 11 is rendered into the condition of "1" between the times $t_3$ and $t_4$, a negative pulse fed to the diode 163 through the capacitor 162 is not applied to the input terminal 133 of the bistable circuit 123, since the diode 163 is supplied from the capacitor 167 with a bias which is greater than $V_2$ and intermediate $V_1$ and $V_2$. Consequently, the output of "1" is not derived at the output terminal 132 of the bistable circuit 123, so that when the switch 11 is put into the condition of "1" after the synchronous motor 22 has stopped completely, the output of "1" is derived at the output terminal 132 of the bistable circuit 123.

Provided that the output of "1" is obtained at the output terminal 132 of the bistable circuit 123 while the synchronous motor 22 is still in operation, the time interval between $t_6$ and $t_7$ varies with the time at which the switch 11 is rendered into the condition of "1" between the times $t_3$ and $t_4$ and this introduces changes in the phase difference between the rotary shafts 2 and 8. Accordingly, the rotary shafts 2 and 8 cannot be driven in phase-synchronized relation to each other while having a predetermined phase difference at all times. However, the present invention completely eliminates such possibility.

Where the switch 11 is put into the condition of "1" between the times $t_1$ and $t_3$ the negative pulse fed to the diode 163 is not applied to the bistable circuit 123 as in the foregoing because the diode 163 has been supplied with a bias of $V_1$ from the capacitor 167, so that the bistable circuit 123 does not yield the output of "1" between the times $t_1$ to $t_4$ as in the foregoing. With the above arrangement, the switch 12 is put in the condition of "1" to stop the synchronous motor 22, after which the switch 11 is rendered in the condition of "1" to permit phase-synchronized rotation of the rotary shafts 2 and 8.

In the case where the switch 11 has been rendered in the condition of "1" between a time $t_0'$, at which the voltage of the capacitor 167 has become $V_2$ a little after the time $t_0$, and the time $t_1$, the negative pulse fed to the diode 163 is not similarly applied to the bistable circuit 123. Further, if the switch 11 is in the condition of "1" at the time $t_0$, a negative pulse to the diode 163 cannot be produced at the time $t_0$. Meanwhile, since the output of "1" is derived at the output terminal 132 of the bistable circuit 123 at the time $t_0$, the switch 12 is put in the condition of "1" and then the switch 11 is also put in the condition of "1", at which time the operation such as above described is carried out. Further, when the switch 11 is rendered in the condition of "1" between the times $t_0$ and $t_0'$, a negative pulse for the diode 163 is produced. In this case, the diode 163 is supplied with a bias less than $V_2$, so that a negative pulse is applied to the input terminal 133 of the bistable circuit 123 but the bistable circuit 123 is in the condition of "1" at the time $t_0'$ and remains unchanged even if the circuit 123 is supplied with a negative pulse between the times $t_0$ and $t_0'$. Consequently, the switch 12 is then put in the condition of 12 as described above, after which the switch 11 is also put in the condition of "1" and the operation such as previously described is achieved.

In the foregoing the switch 12 has been described as in the condition of "1" at the time $t_3$ but the switch 12 may be in the condition of "1" prior to the time $t_3$. Even if the switch 12 is put in the condition of "1" between the times $t_1$ and $t_3$, an operation similar to the aforementioned is achieved. Further, even if the switch 12 is rendered in the condition of "1" between the times $t_0$ and $t_1$, the output terminal 132 of the bistable circuit 123 is not grounded and consequently the output of "1" is produced, thereby to hold the switches 17a and 17b in the condition of "0". Accordingly, the operation described above is not achieved unless the switch 12 is put in the condition of "1". This implies that the control operation for synchronized rotation described above is carried out only when the motors 4 and 22 and the generator 13 are rendered in their steady rotating condition until the relay coil 156a is energized at the time $t_1$, thus ensuring stabilization of the above-described operation.

As has been described in the foregoing, this invention ensures phase-synchronized rotation of the rotary shafts 2 and 8 and the operation therefor is stable and highly reliable.

Although the present invention has been described as applied to phase-synchronized rotation of the antenna of the radar apparatus and rotary indication of the cathode ray tube indicator, it will be understood that the invention is applicable to phase-synchronized rotation of any two rotary shafts. Further, while the cams and switches are employed for detecting the rotational angular positions of the two rotary shafts in the foregoing, it will be understood that rotary members magnetized at a predetermined angular position and mounted on the rotary shafts and magnetic heads placed opposite to the rotary members or optical rotational angular position detecting means could used.

It will be apparent that many modifications and variations may be effected without departing from the scope of the novel concepts of this invention.

We claim as our invention:

1. A phase-synchronized rotating system comprising a first rotary shaft, a second rotary shaft to be driven in phase-synchronized relation to the first rotary shaft, a first driving means for driving the first rotary shaft, a second driving means for driving the second rotary shaft, said second driving means including a synchronous generator driven by said first driving means and a synchronous motor driven by said synchronous generator, and means for controlling the rotation of the second driving means including means for detecting an angular phase difference between the first and second rotary shafts, said controlling means is connected between said synchronous generator and said synchronous motor and includes a first and a second switch means which are ganged together and are inserted into lines connecting windings of said synchronous generator and motor, and said first and said second switch means are controlled by said angular phase difference detecting means to reduce the detected phase difference to zero.

2. A phase-synchronized rotating system as claimed in claim 1 wherein the means for detecting the angular phase difference between the first and second rotary shafts includes a rotary member mounted on the first rotary shaft, means for generating a signal representative of an angular position of the first rotary shaft in cooperation with the rotary member, a rotary member mounted on the second rotary shaft and means for generating an angular position of the second rotary shaft in cooperation with the rotary member.

3. A phase-synchronized rotating system as claimed in claim 1 wherein the means for controlling the rotation of the second rotary shaft driving means includes means for controlling the rotation of the second rotary shaft in a manner to cause the second rotary shaft to initiate rotation in phase-synchronized relation to the first rotary shaft.

4. A phase-synchronized rotating system for first and second shafts comprising a first driving means connected to said first shaft, a synchronous generator driven by said first driving means, a logic circuit coupled to said first and second shafts and responsive to their positions, a synchronous motor connected to said second shaft, electrical switching means connected between said synchronous generator and said synchronous motor and controlled by said logic circuit so that the synchronous motor runs when the angular positions of said first and second shafts do not coincide and the synchronous motor does not run when the angular positions of said first and second shafts coincide.

5. A phase-synchronized system according to claim 4 wherein dynamic braking is applied to said synchronous motor when the angular positions of said first and second shafts coincide.